United States Patent [19]

McAlister

[11] 4,333,789
[45] Jun. 8, 1982

[54] APPARATUS FOR MANIFOLDING MULTIPLE PASSAGE SOLAR PANEL

[76] Inventor: Roy E. McAlister, 5285 Red Rock North, Phoenix, Ariz. 85018

[21] Appl. No.: 213,198

[22] Filed: Dec. 4, 1980

Related U.S. Application Data

[60] Division of Ser. No. 172,418, Jul. 25, 1980, Pat. No. 4,300,971, which is a continuation-in-part of Ser. No. 32,635, Apr. 23, 1979.

[51] Int. Cl.³ .................. B32B 31/04; B32B 31/26
[52] U.S. Cl. .................. 156/499; 156/244.11; 156/244.18; 156/293; 156/296; 156/500; 425/208; 425/376 R; 425/376 B; 425/378 R
[58] Field of Search .................. 156/244.11, 244.18, 156/293, 296, 500; 165/178; 425/112, 113, 190, 191, 192, 208, 324.1, 325, 376 R, 376 B, 377, 378 R, 379, 381.2, 382 R, 384, 461, 507, 508, 547, 548, 549, 550, 552

[56] References Cited

U.S. PATENT DOCUMENTS

| | | | |
|---|---|---|---|
| 2,810,168 | 10/1957 | Nyborg | 425/548 |
| 2,995,159 | 8/1961 | Berggren | 425/550 |
| 3,001,233 | 9/1961 | Ernst | 425/548 |
| 3,305,893 | 2/1967 | Machen | 425/376 R |
| 3,645,659 | 2/1972 | Schott | 425/378 |
| 3,689,184 | 9/1972 | Morse | 425/376 R |
| 3,774,811 | 11/1973 | Staerman | 425/548 |
| 3,797,984 | 3/1974 | Yago et al. | 425/548 |
| 3,841,938 | 10/1974 | Grosse-Holling et al. | 156/293 |
| 3,934,323 | 1/1976 | Ford et al. | 156/296 |
| 3,954,366 | 5/1976 | Fields | 425/378 R |
| 4,038,013 | 7/1977 | Tomlinson | 425/378 S |

Primary Examiner—Caleb Weston
Attorney, Agent, or Firm—Cushman, Darby & Cushman

[57] ABSTRACT

A method of sealingly connecting a thermoplastic solar panel structure comprising a multiplicity of elongated thin wall sections defining a multiplicity of parallel passages extending longitudinally between the ends of said panel structure to a thermoplastic manifold tube comprising the steps of mounting an elongated mandrel having a multiplicity of transversely projecting elements corresponding in number and spacing to the panel passages to be communicated with the interior of the manifold tube, positioning a side wall portion of the manifold tube in predetermined spaced relation with the open end of the panel structure so that the projecting elements of the mandrel are generally longitudinally aligned with the open ends of a corresponding member of the passages in the panel structure, heating the spaced panel structure end and the manifold tube side wall portion to soften the thermoplastic material thereof, moving the mandrel within the manifold tube so as to position the projecting elements through the side wall portion thereof and into the open ends of said corresponding panel structure passages and the manifold tube toward the panel structure end so as to cause the manifold tube side wall portion to apply a pressure to the panel structure end sufficient to deform the thermoplastic material thereof and effect a fusing of the same into a unitary mass, and withdrawing the mandrel in the direction of extent of the projecting elements to a position within the interior of the manifold tube and then longitudinally out of the manifold tube and apparatus for carrying out the method.

22 Claims, 20 Drawing Figures

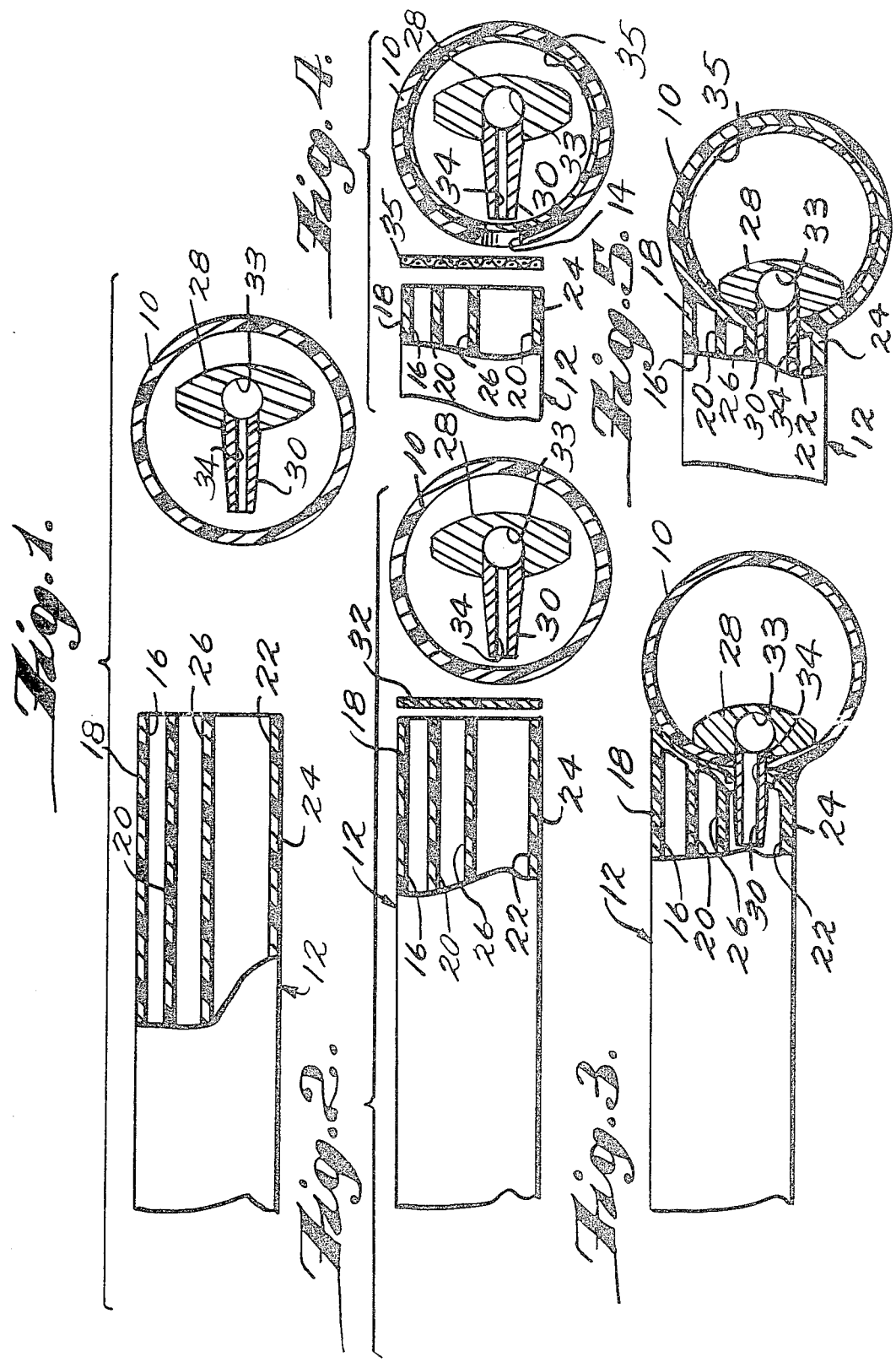

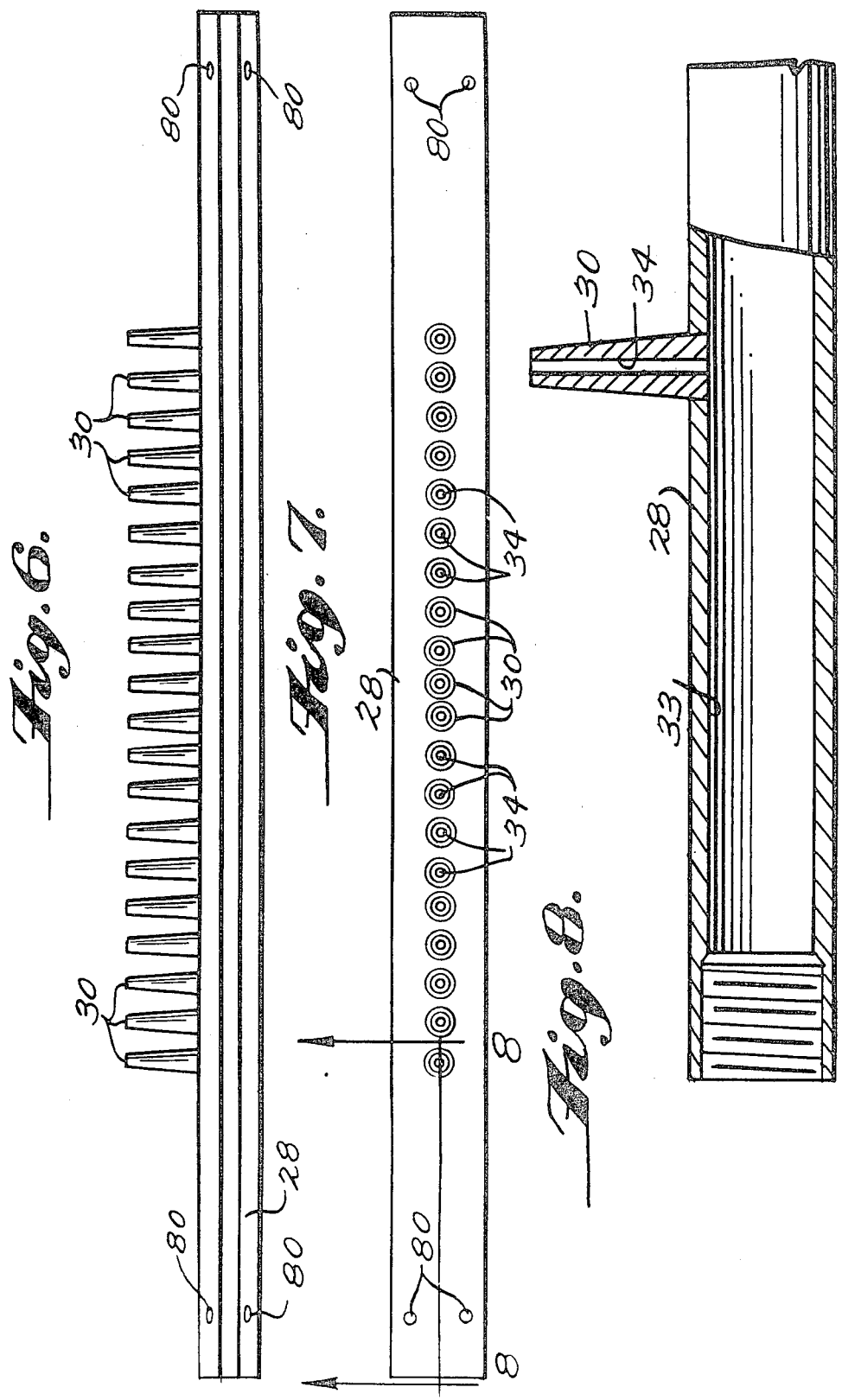

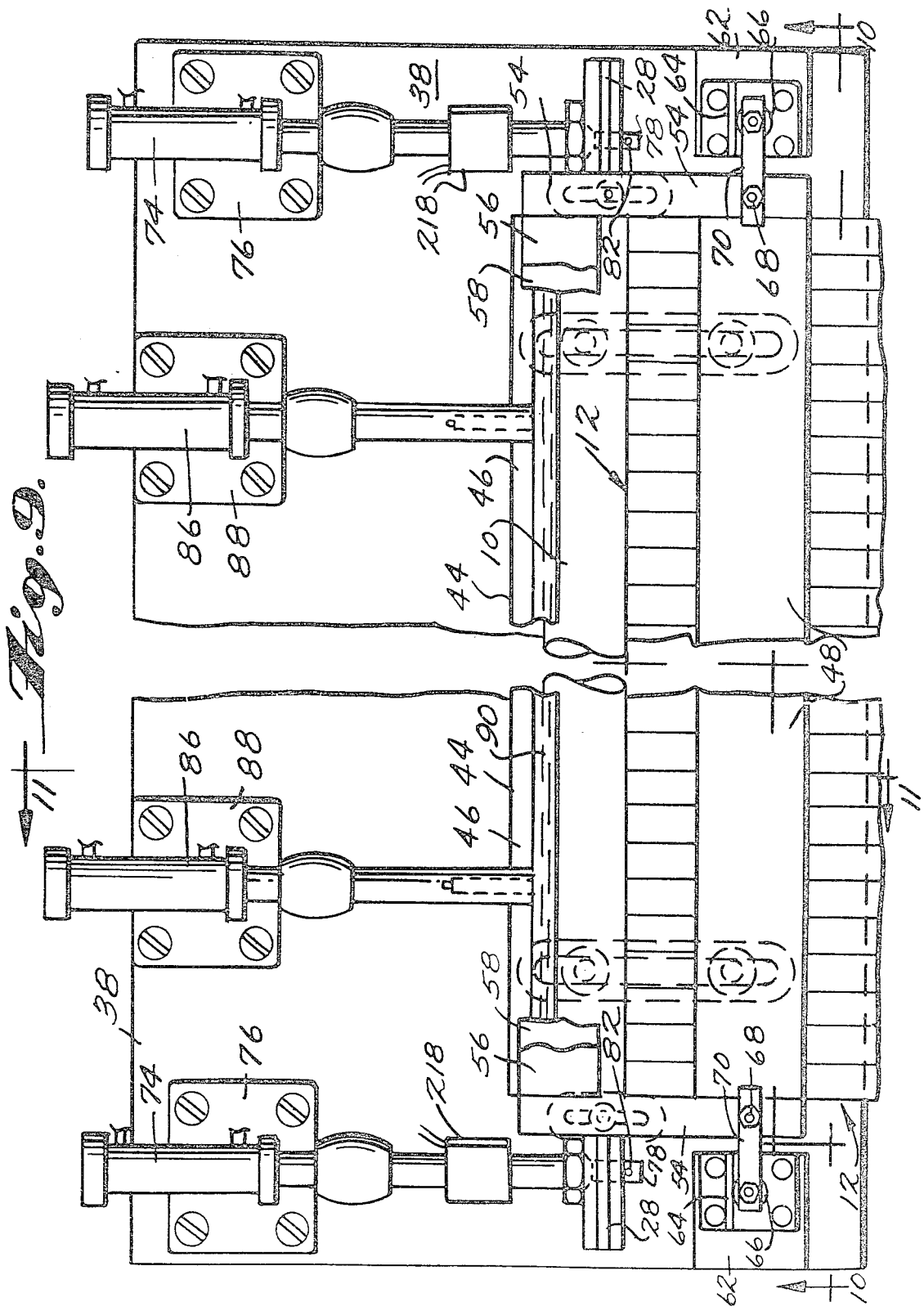

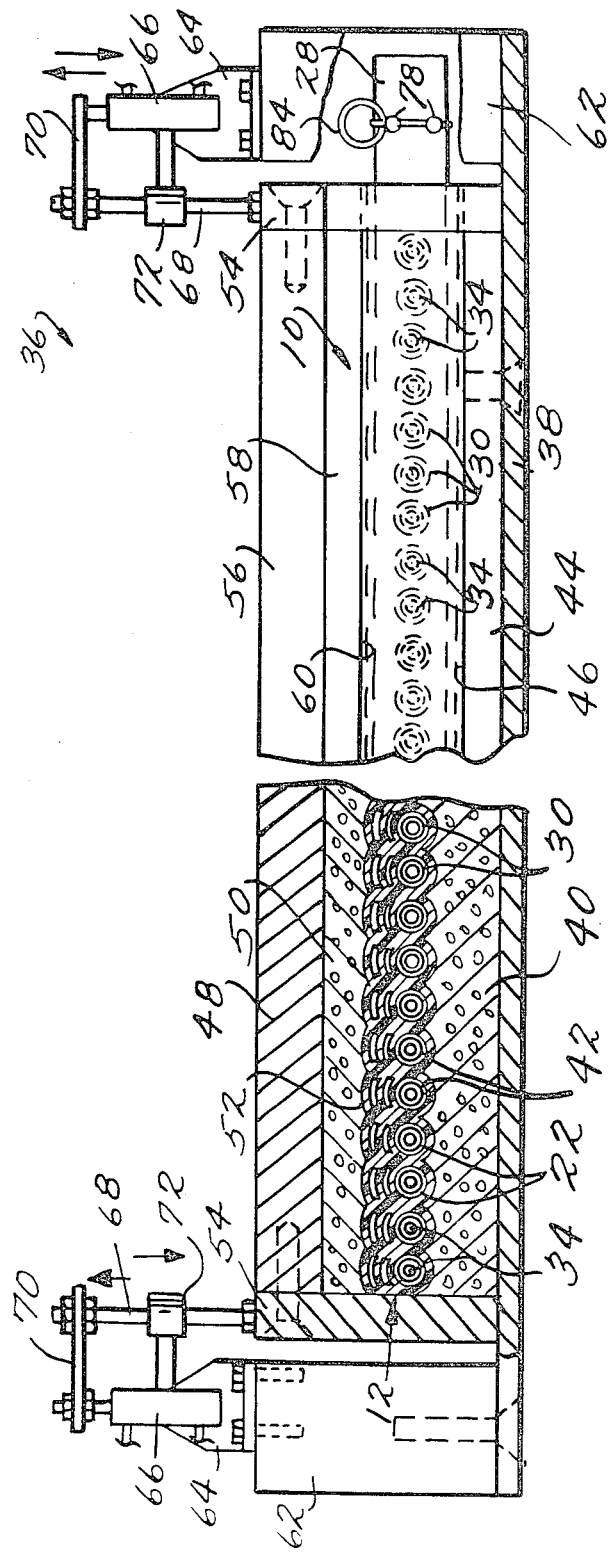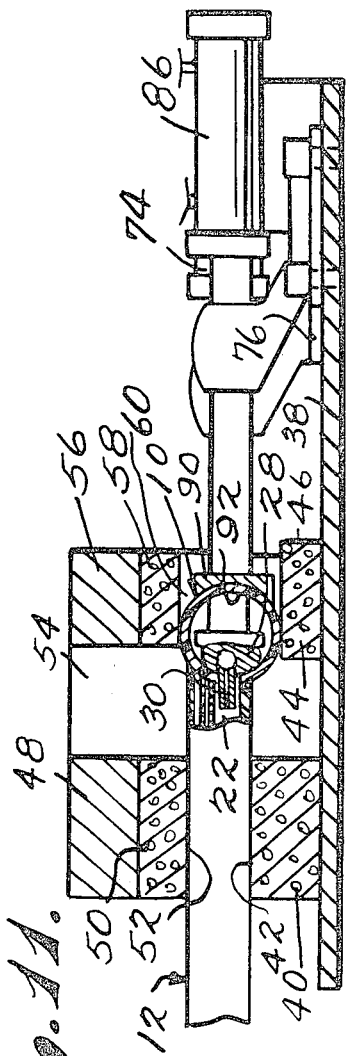

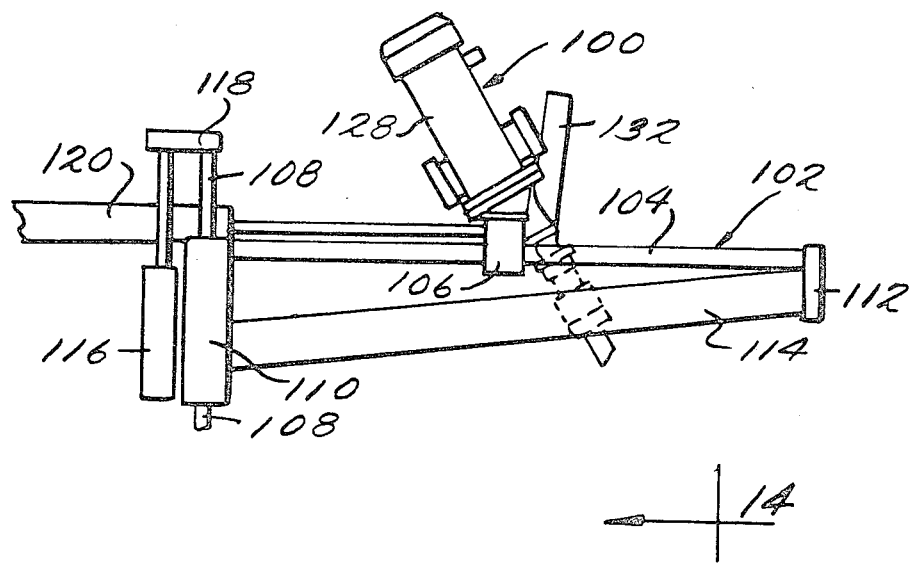
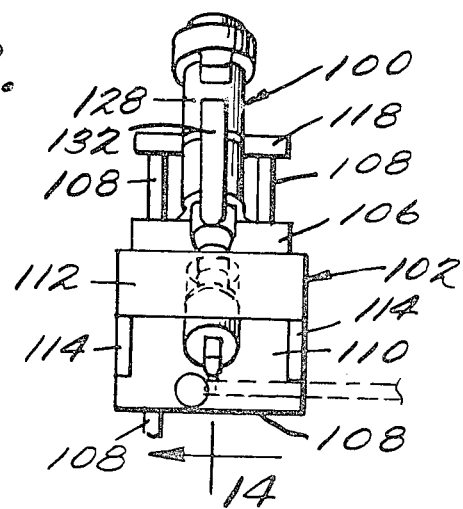
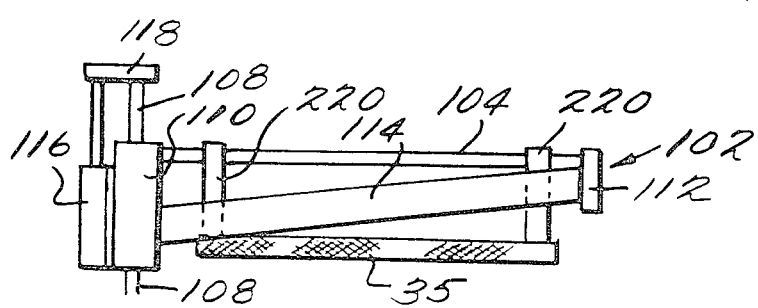

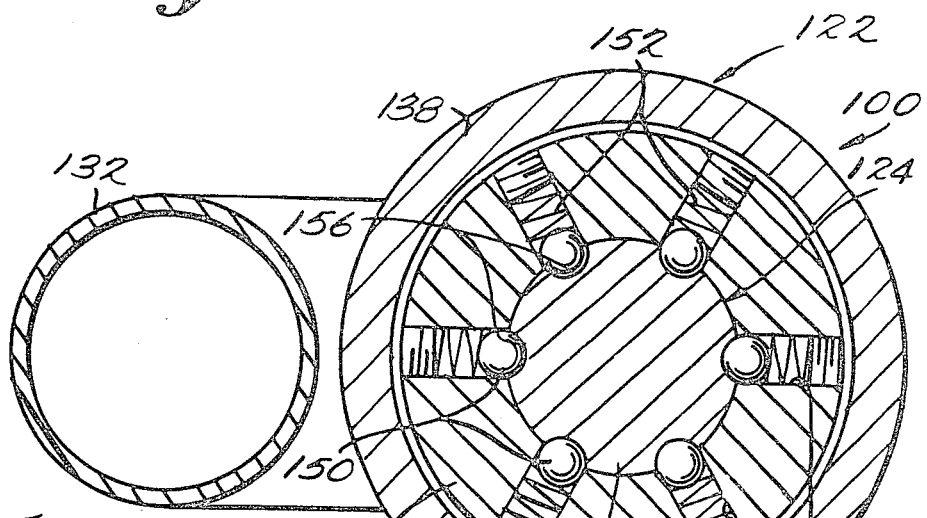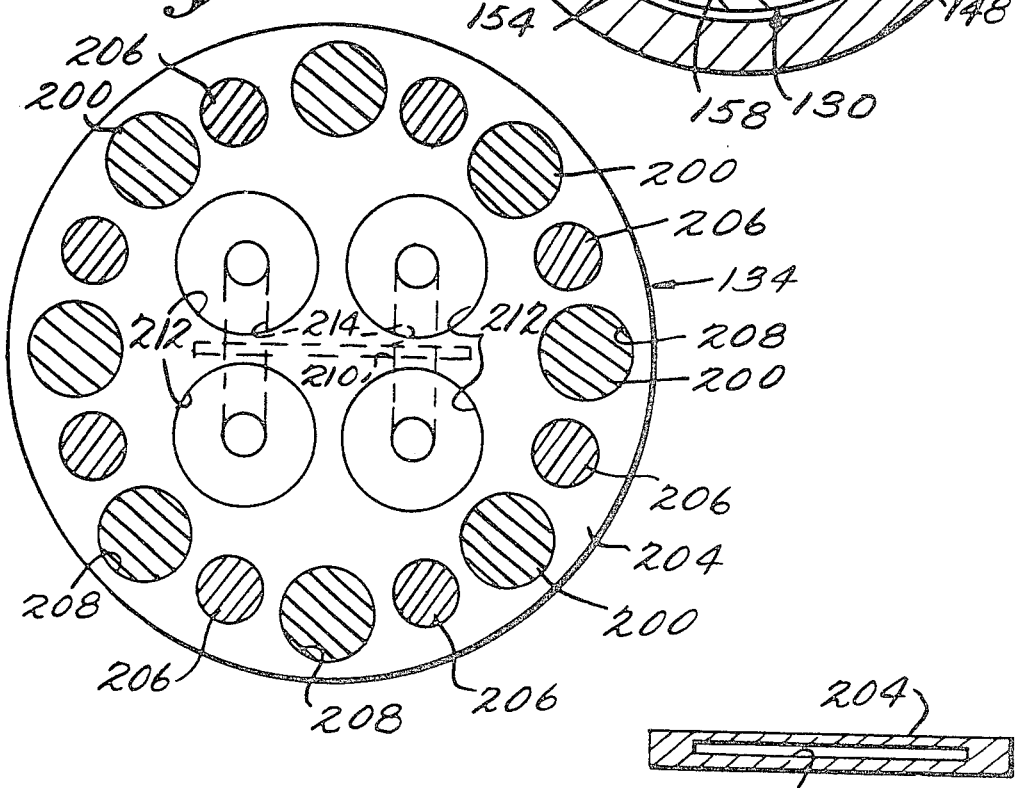

APPARATUS FOR MANIFOLDING MULTIPLE PASSAGE SOLAR PANEL

This application is a division of application Ser. No. 172,418, filed July 25, 1980, now U.S. Pat. No. 4,300,971 which is a continuation-in-part of U.S. application Ser. No. 32,635, filed Apr. 23, 1979, entitled METHOD AND APPARATUS FOR MANIFOLDING MULTIPLE PASSAGE SOLAR PANEL.

This invention relates to solar energy and more particularly to an improved method and apparatus for effecting the connection between manifold tubes and the open ends of a multiple passage solar panel structure.

In my co-pending application Ser. No. 6,754, filed Jan. 26, 1979, entitled IMPROVED PLASTIC SOLAR PANEL STRUCTURE AND METHOD AND APPARATUS FOR MAKING THE SAME, which issued on June 2, 1981 as U.S. Pat. No. 4,271,103, there is disclosed a method and apparatus for extruding a solar panel structure from a thermoplastic material, preferably polycarbonate. The resultant panel structure is made up of a multiplicity of integrally connected elongated thin wall sections which define a multiplicity of elongated parallel passages. Preferably the passages are arranged in side-by-side rows with the outermost row of passages being defined along their outer surfaces by upwardly arching thin wall sections of lens-shaped cross-sectional configuration. Similar lens-shaped thin wall sections define the lower portions of the outer row of passages and the inner row of passages is defined essentially by elongated thin wall sections of generally cylindrical configuration. The upper portions of the cylindrical thin wall sections define with the lower lens-shaped thin wall sections a row of intermediate passages. This construction is likewise shown in my earlier co-pending application Ser. No. 860,779, filed Dec. 15, 1977, entitled RADIANT ENERGY HEAT EXCHANGER SYSTEM, now abandoned in favor of continuation application Ser. No. 98,814, filed Nov. 30, 1979, which issued on July 21, 1981 as U.S. Pat. No. 4,279,244, together with other constructional modifications which can be embodied in the panel structure. Moreover, there is disclosed in the earlier application various manifolding arrangements for the various passages provided in the panel structure.

An object of the present invention is to provide an improved method and apparatus for effecting the connection between a pair of manifold tubes and the opposite ends of a panel structure in which the opposite open ends of certain of the passages at each end of the panel structure are communicated with the interior of the adjacent manifold tube through an adjacent side wall portion thereof. The invention importantly includes the utilization of an elongated mandrel bar having a series of projecting elements extending transversely therefrom of a number equal to the number of panel passages to be communicated with the interior of the manifold tube and spaced correspondingly. In practicing the present method, the mandrel bar is inserted longitudinally through the manifold tube prior to its connection with the panel structure end. The mandrel bar is initially positioned so that all of the projecting elements are disposed within the interior periphery of the manifold tube. In conjunction with or just prior to actually effecting the connection in accordance with the present method the mandrel bar is moved transversely within the manifold tube so as to extend the projecting elements through the side wall portion of the manifold tube. It is contemplated that the side wall portion of the manifold tube through which the projecting elements extend may be preformed with a series of openings to facilitate such extension; however, preferably such openings are formed by the projecting elements themselves during the aforesaid movement with respect to the manifold tube. Preferably, this movement is accomplished just prior to or simultaneously with the formation of the connection. The connection itself is accomplished in accordance with the present method by providing sufficient heat to soften the polymer material forming the end portion of the panel structure and the side wall portion of the manifold tube. Such heating is preferably accomplished while the two portions are maintained in a predetermined closely spaced aligned relationship with respect to one another.

The heating of the plastic material can be accomplished in any known fashion. In one preferred embodiment sufficient heat is provided by extruding a film of hot polymeric sealing material between the two spaced portions so that the heat of the film, as well as the heat of the extruding instrumentality utilized during the time of proximity, brings the plastic material of the spaced portions to a softening point.

In another embodiment of the invention, the heat is provided by positioning a resistance screen wire between the closely spaced portions so that with this arrangement there is a fusing of the material of the panel and tube portions without the necessity of providing additional hot sealing material. It is an important feature of the present invention that in effecting the actual connection after the panel structure and manifold tube have been aligned and the spaced portions thereof have been heated to move the projecting elements of the mandrel bar through the side wall portion of the manifold tube (or openings therein) and within the corresponding open ends of the passages in the panel structure thereby enabling the engagement of the softened side wall portion of the manifold tube with the softened end portion of the panel structure to be effected with a pressure sufficient to cause a deformation of the softened plastic material. By following these procedures it becomes possible to achieve a highly efficient and satisfactory sealed communication by virtue of the displacement of the surfaces of the interconnected portions in such a way as to insure that the intercommunication desired will not become plugged. The surface deformation is important because it has the effect of breaking up surface impurities which could otherwise result in inefficiencies and leakage in the event that only non-deforming contact were to be made.

Preferably, the projecting elements are formed of tubular elements so as to provide an air passage therethrough and the mandrel bar is formed with an air passage which communicates with each of the air passages in the projecting elements. The capability of feeding air under pressure into the mandrel bar and outwardly through each of the projecting tubular elements thereof may be used in several ways in facilitating the formation of the final assembly of the panel structure and manifold tubes. Where the manifold tube has a relatively thick wall and a relatively small inside diameter, the reach of the projecting elements of the manifold may be insufficient to insure penetration and development of an adequate flow passage therethrough. Under these circumstances the air flow capability is utilized to supply a flow of fluid under pressure through the tubular elements during their movement through the side wall portion of the manifold so as to insure that a passageway will be formed by blow molding contacted sections of the side wall portion of the manifold tube into the walls of the panel structure defining the passages to be communicated. Moreover, fluids may be selected and administered subsequent to the formation in the manner indicated above to color, chemically treat or heat treat the formed connection. In addition, it has been found advantageous to mechanically vibrate the mandrel during and after the connection has been effected to cause stress relief of the joint areas. With the utilization of certain resins, as for example, polycarbonates, as the thermoplastic material for the panel structure and manifold tubes, it has been found to be desirable to stress relieve and heat treat the joint by flowing heated fluids such as nitrogen, carbon dioxide, argon, silicone oil or fluorocarbon fluids through the air passage in one mandrel bar, through the communicated passages of the panel structure and out of an opposite mandrel bar utilized in effecting connection of a second manifold tube with the opposite end of the panel structure. Following such heat treatment it has been found desirable to slow cool or quench the connection by communicating the mandrel with air under pressure immediately following the securement of the manifold tube with the panel structure end and any of the aforesaid fluid treatments. By simultaneously effecting securement of the manifold tubes at both ends and suitably controlling the introduction of the air under pressure through the two mandrel bars an immediate pressure testing of the effectiveness of the sealing connection can be made. The exterior surfaces of the projecting elements constitute release surfaces with respect to the sealing material utilized, and consequently after the connection has been completed the mandrel bar can be retracted within the manifold tube so as to bring the projecting elements wholly within the interior periphery of the manifold tube, thus enabling the mandrel bar to be removed from the manifold tube by longitudinal movement.

The invention also contemplates apparatus for carrying out the method which includes gripping means for fixedly positioning each end of the panel structure, means for effecting a movement of the mandrel bar within the manifold tube to be mounted in the direction of the projecting elements and means for moving both the manifold tube and the mandrel bar into pressure engagement with the panel structure end. The apparatus contemplates means for extruding a strip or film of hot sealing material between the manifold tube and panel structure end before the manifold tube is moved into engagement with the panel end and the projecting elements of the mandrel are moved to extend through both the openings in the side wall portion of the manifold tube and the corresponding open ends of the passages in the panel structure. Alternatively, the apparatus contemplates means for heating the end of the panel structure and adjacent side wall portion of the manifold tube prior to the movement of the manifold tube into engagement with the panel structure end.

These and other objects of the present invention will become more apparent during the course of the following detailed description and appended claims.

The invention may best be understood with reference to the accompanying drawings, wherein an illustrative embodiment is shown.

In the drawings:

FIGS. 1, 2 and 3 are each similar schematic vertical sectional views taken through a side wall opening in a manifold tube and a corresponding passage in a panel structure end which are to be sealingly secured together, the three views illustrating the three basic procedural steps embodied in the present method for effecting the securement;

FIGS. 4 and 5 are views similar to FIGS. 2 and 3 showing an alternative procedure in accordance with the principles of the present invention;

FIG. 6 is a top plan view of a preferred form of mandrel structure utilized in carrying out the principles of the present invention;

FIG. 7 is a side elevational view of the mandrel structure shown in FIG. 6;

FIG. 8 is an enlarged fragmentary sectional view taken along the line 8—8 of FIG. 7;

FIG. 9 is a fragmentary top plan view of a panel structure and manifold tube handling apparatus embodying the principles of the present invention for carrying out the method of the invention;

FIG. 10 is a sectional view taken along the line 10—10 of FIG. 9;

FIG. 11 is a sectional view taken along the line 11—11 of FIG. 9;

FIG. 12 is a front elevational view of a hot sealing material extruding device useful in conjunction with the apparatus shown in FIGS. 9-11 in practicing the procedures of the present method exemplified in FIGS. 1-3;

FIG. 13 is a side elevational view of the device shown in FIG. 12;

FIG. 15 is an enlarged fragmentary sectional view taken along the line 15—15 of FIG. 14;

FIG. 18 is an enlarged fragmentary sectional view taken along the line 18—18 of FIG. 14;

FIG. 19 is an enlarged fragmentary sectional view taken along the line 19—19 of FIG. 14; and FIG. 20 is a view similar to FIG. 12 illustrating the arrangement for bringing the electrical resistance wire screen into operative position in practicing the procedures of the present method exemplified in FIGS. 4 and 5.

Figure 14:
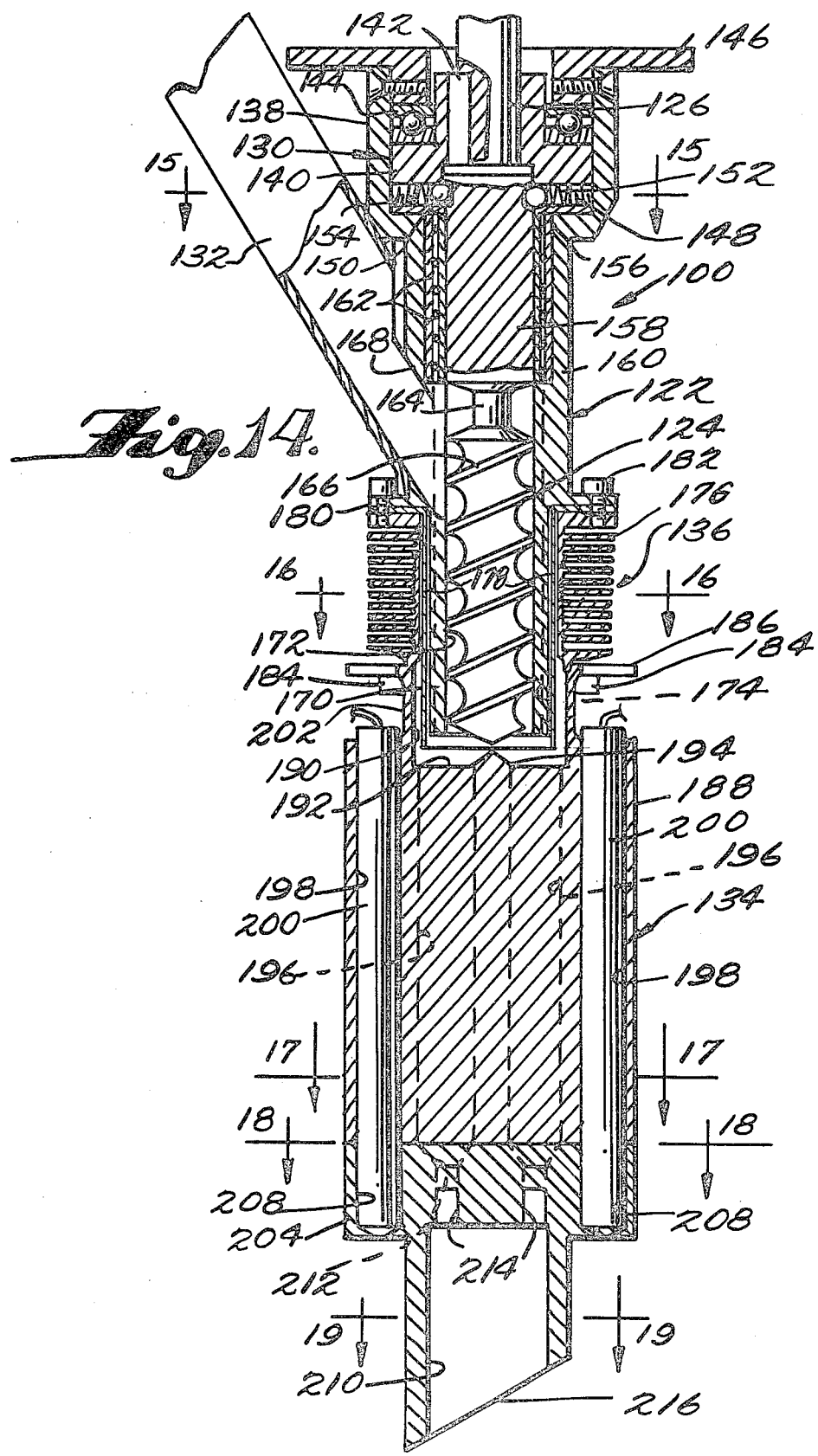
FIG. 14 is an enlarged fragmentary sectional view taken along the line 14—14 of FIG. 13.

Referring now more particularly to the drawings, there is shown in FIGS. 1-3 thereof a schematic illustration of successive steps undertaken in practicing the method of the present invention which has the effect of sealingly securing a manifold tube, generally indicated at 10, to an open end of a solar panel structure, generally indicated at 12. Preferably the manifold tube 10 is formed of a suitable thermoplastic material, as, for example, polycarbonate, in the form of a simple cylindrical wall. As shown in FIG. 1, the cylindrical wall is initially imperforate. It will be understood, however, that a multiplicity of openings may be initiallly preformed in one side portion of the wall. Where preformed openings are provided, each of the openings is preferably punch cut and extends in a longitudinal row within the wall portion of the manifold tube 10. In the embodiment shown the centers of the openings would be disposed in a plane passing through the axis of the tube. It will be understood, however, that the multiplicity of openings may have their centers disposed in a plane which is at an angle (e.g. 3° 10′) with respect to the axis of the manifold tube in situations where the assembly is to be used in a lapped roof of siding installation, as disclosed in my co-pending application Ser. No. 32,634 filed Apr. 29, 1979, entitled LAPPED SOLAR PANEL ROOF INSTALLATION, which issued on Apr. 14, 1981 as U.S. Pat. No. 4,261,338.

The panel structure 12 may be made in accordance with my co-pending application Ser. No. 6,754, filed Jan. 26, 1979, entitled IMPROVED PLASTIC SOLAR PANEL STRUCTURE AND METHOD AND APPARATUS FOR MAKING THE SAME, U.S. Pat. No. 4,271,103, wherein there is disclosed a method and apparatus for extruding a solar panel structure from a thermoplastic material, preferably fluoropolymers. The resultant panel structure 12 is made up of a multiplicity of integrally connected elongated thin wall sections which define a multiplicity of elongated parallel passages. Preferably the passages are arranged in side-by-side rows with the outermost passages 16 being defined along their outer surfaces by upwardly arching thin wall sections 18 of lens-shaped cross-sectional configuration. Similar lens-shaped thin wall sections 20 define the lower portions of the upper row of passages 16 and a lower row of passages 22 is defined essentially by elongated thin wall sections 24 of generally cylindrical configuration. The upper portions of the cylindrical thin wall sections 24 define with the lower lens-shaped thin wall sections 20 a row of intermediate passages 26. This construction is likewise shown in my earlier co-pending application Ser. No. 860,779, filed Dec. 15, 1977, entitled RADIANT ENERGY HEAT EXCHANGER SYSTEM, now abandoned in favor of continuation application Ser. No. 98,814, filed Nov. 30, 1979, which issued on July 21, 1981 as U.S. Pat. No. 4,279,244, together with other constructional modifications which can be utilized in the panel structure. Moreover, there are disclosed in the earlier application Ser. No. 98,814 filed Nov. 30, 1979 various manifolding arrangements for the various passages provided in the panel structure, all of which can be used with the present invention.

The present process importantly involves the utilization of an elongated mandrel bar 28, a preferred construction of which is shown in FIGS. 6–8. As shown, the bar 28 has a multiplicity of projecting elements 30 extending tranversely therefrom of a number corresponding with the number of passages in the panel structure 12 to be communicated with the interior of the manifold tube 10 and spaced apart in a manner corresponding with the spacing of such passages.

With reference to FIG. 1, the first step of the present method is to mount the mandrel bar 28 within the interior periphery of the manifold tube 10. In FIG. 1, the manifold tube 10 is shown with the mandrel bar 28 mounted therein wholly within the interior periphery with the manifold tube 10 at a position spaced from the open end of the panel 12 to which it is to be sealingly secured. The next step in the process is to move the side wall portion of manifold tube 10 which is to join the panel structure into a predetermined relatively closely spaced relationship with the open end of the panel structure 12. Where the manifold tube has preformed openings in the side wall portion thereof, these are generally longitudinally aligned with the lower row of passages 22 with which communication is to be effected. In the embodiment shown, the manifold tube 10 is to be connected with the panel structure 12 so that all of the lower passages 22 of the panel structure are communicated with the interior of the manifold tube. Consequently projecting elements 30 of the mandrel bar 28 are generally aligned longitudinally with the lower row of passages 22. In the embodiment of the method illustrated in FIGS. 1–3, a film 32 of hot sealing material, preferably polycarbonate, is extruded between the open end of the panel structure 12 and side wall portion of the tube 10 while in the aforesaid predetermined spaced relationship shown in FIG. 2. The film 32 extruded has a preferred thickness of approximately 0.0020 to 0.06″ and is extruded at a temperature of approximately 500° F. While it is within the contemplation of the present invention to extrude the film strip lengthwise, in the preferred mode the film strip is extruded width-wise proceeding from one side of the panel structure end to the other side. As the film or strip 32 of hot thermoplastic is extruded, the thin wall sections of the adjacent end of the panel structure 12 and the adjacent side wall portion of the manifold tube 10 are heated to a softening temperature, as for example, 540° F. Immediately following the extrusion of the film or strip 32 and the application of the heat to the panel structure and manifold tube as aforesaid, both the mandrel bar 28 and the manifold tube 10 are moved toward the panel structure end. During this movement the projecting elements 30 which are already positioned within the manifold tube in longitudinal alignment with lower passages 14, move through the adjacent side wall portion of the manifold tube and the hot film or strip 32 bringing annular portions of the side wall of the manifold tube and the film or strip 32 into the interior of the lower passages 22. The horizontal movement of the manifold tube toward the panel structure end is continued until the exterior of the heated side wall portion of the manifold tube 10 engages the heated wall sections of the open end of the panel structure 12 which are softened and deformed under a moving pressure equal to approximately 100 psi of cross-sectional area of the panel structure 12.

The deformation of the wall sections of the panel structure and side wall portion of the manifold tube softened by heat constitutes a significant feature of the present method, insuring a more efficient bond in that surface areas of both the panel structure and manifold tube which are to be sealingly engaged are displaced so that contaminants which may have become disposed on such surfaces are likewise displaced. Moreover, it will be noted that the distortion is such as to cause the thin wall sections defining the lower passages 22 to deform into engagement with the periphery of the projecting elements 30 and the ends of the thin wall sections defining the intermediate passages 26 and upper passages 16 to engage the side wall portion of the manifold tube and effectively seal off the associated ends of these passages. In FIG. 3, the deformed plastic material of the panel structure 12, the film or strip 32 and the manifold tube 10 is shown with different cross-hatching, it being understood, however, that a fusing into a unitary mass actually takes place.

It is preferable in undertaking the procedure noted above to utilize a mandrel structure such as shown in FIGS. 7–9 in which the mandrel bar 28 is formed with a central passage 33 communicating with holes 34 formed in the projecting elements 30. With this arrangement, it is then possible in accordance with the principles of the present invention to pump a fluid into the central air passage 33 and out of the air holes 34 during the pressure engagement of the manifold tube 10 with the end of the panel structure 12. The flow of fluid under pressure outwardly of the air holes 34 during the formation of the series of connections between the ends of the passages 22 and the interior of the manifold tube insures that in each joint a passageway will be formed even if it is necessary to form such passage by blow molding contacted sections of the side wall portions of the manifold tube into the walls of the panel structure defining the associated passage to be communicated. This blow molding assistance may be particularly utilized where the manifold tube has a relatively thick wall and a relatively small inside diameter so that the reach of the projecting elements through the wall is relatively limited. Ordinarily, however, it is contemplated that this reach will be sufficient to achieve a piercing action mechanically without the blow molding effect even though such capability is present and may be used. Moreover, the fluid initially used during the pressure engagement of the manifold tube with the end of the panel structure 12 is preferably selected so as to color, chemically treat and/or heat treat the connection. In conjunction with such treatment, mechanical vibration of the mandrel is also preferably effected to cause stress relief of the joint areas. Following color, chemical or heat treatment with fluids during the pressure engagement, it is desirable to cool the joint by pumping a cooling fluid into the air passage 33 and out of the air holes 34. The cooling fluid is preferably air although it may be simply a treating fluid such as nitrogen, carbon dioxide, argon, silicone oil or hydrocarbon fluids with its temperature reduced to provide the desired cooling effect. As indicated, however, the preferred cooling fluid is simply the utilization of air. The introduction of cooling air in this fashion has two distinct advantages. First, it serves to effect an even cooling of the hot connection which has been formed and second, when the manifold tube being applied constitutes the second of the two end manifolds the introduction of cooling air under pressure through openings 34 pressurizes the passages 22, thus testing the effectiveness of the connection which has been made. Preferably, it is desirable to manifold both open ends of the panel structure simultaneously, or substantially so. This arrangement is particularly desirable when treating fluids are pumped since the arrangement makes it possible to establish a flow through the passages 22 from one mandrel to the other.

In FIGS. 4 and 5, there is shown an alternative procedural arrangement in which, instead of extruding a hot film or strip 32 of sealing material as shown in FIG. 2, an electrical resistance wire screen 35 of elongated configuration is moved into a position between the predetermined spaced manifold tube 10 and panel structure end. The resistance wire screen 35 generates within it a temperature of approximately 1500° F., which heat is radiated to the adjacent thin wall sections of the panel structure 12 and to the adjacent side wall portion of the manifold tube 10. This radiation heat treatment is carried on for a very short period of time until the thermoplastic material reaches a softening point at a temperature of approximately 540° F., at which time the aforesaid horizontal movement of the manifold tube 10 and mandrel bar 28 takes place, as from the position shown in FIG. 4 to the position of FIG. 5. Here again, the engaging pressure that is applied is substantially the same as indicated above, resulting in the same sort of surface deformation previously noted so that surface contaminants are again displaced and an efficient fusing of the materials of the panel structure and manifold tube takes place without the necessity of providing additional sealing material as before.

The modifications of FIGS. 4 and 5 are described above in connection with the utilization of an imperforate manifold tube 10, such as that previously shown in FIGS. 1–3 and referred to above in the description relating to the same. Consequently it will be evident that the modifications of FIGS. 4 and 5 are fully applicable to imperforate manifold tubes as well as perforated tubes. FIGS. 4 and 5, however, illustrate still another variable within the scope of the present invention. Specifically, the manifold tube as shown is a tube assembly including an exterior tube 10 and an interior liner tube 35. The significance of utilizing a manifold tube assembly rather than single manifold tube is that the tube assembly contemplates the joining of dissimilar materials such as polysulfone to polycarbonate. Tube 10, for instance, could be polycarbonate, while panel 12 could be polysulfone. Joining by first heating with the resistance wire screen as previously described has been found to produce sound, strong weldments. It is possible to produce such joints and also only expose the working fluid to one material, by including a liner tube 35 made from the same material as the panel structure 12. In this instance it is preferred to prepunch holes 14 in tube 10 but not in liner tube 35. This allows pins 30 to thermoform liner 35 through the holes 14 in exterior tube 10 and to weld the thermoformed liner tube bubbles to the walls of panel structure 12.

Referring now more particularly to FIG. 11, there is shown therein a preferred apparatus 36 for carrying out the panel structure and manifold tube handling procedures of the method of the present invention. As shown, the apparatus 36 includes a main base plate 38 which is adapted to be suitably mounted on a bench surface or the like (not shown). Fixed to the upper surface of the mounting plate 38 adjacent one end portion thereof is a pad 40 preferably formed of a foamed material (e.g. silicone resin). The upper surface of the foam pad 40 is provided with the configuration as indicated at 42 which conforms with the configuration of the lower surface of the panel structure 12. Spaced from the pad 40 is a second pad 44 which is also secured to the upper surface of the mounting plate 38. The pad 44 likewise is preferably made of foamed material such as, for example, silicone, the upper surface being suitably dense as by silicone coatings or the like, as indicated at 46. The upper surface 46 of the pad 44 is preferably a planar horizontally extending surface disposed in a position to engage the lower portion of the manifold tube 10 so as to provide for the proper vertical alignment of the manifold tube 10 with the panel structure end when the latter is engaged on the surface 42. For purposes of fixedly securing the open end of the panel structure 12 in engagement with the surface 42 there is provided a mounting bar 48 extending across the end of the panel structure in a position thereabove. Mounted to the undersurface of the bar 48 is a gripping pad 50 formed of foamed material having a shaped lower surface 52 which is configured to engage and conform with the upper surface of the panel structure 12. The ends of the mounting bar 48 are secured to end members 54 which members extend horizontally in a direction coextensive with the manifold tube pad 44. Extending between the end members 54 above the pad 44 is a second mounting bar 56 which is fixedly secured between the end members 54 in spaced relation to the mounting bar 48. Below the mounting bar 56 there is mounted an upper foam pad 48 having a horizontally extending planar lower surface provided with a suitable surface density as, for example, silicone, as indicated at 60. Here again, the vertical position of the surface 60 is interrelated with the vertical position of the irregular surface 52 so that when the surface 52 is in gripping engagement with the upper surface of the end portion of a panel section, the surface 60 will frictionally engage the upper portion of the manifold tube 10.

It is within the contemplation of the present invention to make the assembly just described including end member 54, mounting bars 48 and 56 and pads 50 and 58 removably mounted into and out of the operative position, as shown in FIGS. 8-10 and to provide pivoted clamps which will hold the assembly in such position. In the drawings, however, there is shown a means for raising the assembly from its operative gripping position to a raised receiving position. As shown, such means includes a pair of mounting blocks 62 suitably fixed to the ends of the mounting plate 38, a pair of mounting brackets 64 fixed to the upper surface of the blocks, a pair of pressure operated piston and cylinder units 66 fixed to the brackets. Piston and cylinder units 66 serve to move vertically a pair of mounting rods 68, each being fixed at its lower end to the associated end member 54 and at its upper end to the piston of the associated piston and cylinder unit 66 as by a connecting plate 70. Mounting rods 68 may be guided in their vertical movement by a pair of sleeves 72 fixed to the brackets 64 if desired.

It will be understood that the structure thusfar described constitutes a gripping assembly which in the operative position shown, serves to fixedly secure the end portion of a panel structure 12 so that the end thereof to which the manifold tube 10 is to be sealingly secured is positioned at a predetermined position beyond the pad 40. In addition, the pads 58 and 44 serve to frictionally hold a manifold tube 10 therebetween in proper vertical alignment and in an initial horizontally spaced relation with respect to the end of the panel structure and to permit controlled horizontal movement of the manifold tube 10 from such position into an initial predetermined spaced position with respect to the panel end and finally into pressure deformed engaged relation with respect thereto. Such moving means, as best shown in FIG. 9, includes a pair of pressure actuated piston and cylinder units 74 fixedly mounted at the ends of the mounting plate 38 opposite from the mounting block 62, as by a pair of mounting brackets 76. Mounted on the outer end of each of the piston rods of the units 74 is a vertically spaced pair of longitudinally forwardly extending pins 78. These pins are adapted to engage within a pair of openings 80 formed in each of the end portions of the mandrel bar 28 which extends outwardly of the ends of the manifold tube 10 when the mandrel bar 28 is inserted therein, as aforesaid. The pins 78 preferably have vertical openings 82 formed therein in the extremities thereof which extend beyond the ends of the mandrel bar so as to receive locking pins 84 therethrough which serve to temporarily secure the mandrel bar to the piston rods of the units 74 for movement in both horizontal directions.

The moving means also includes a second pair of pressure actuated piston and cylinder units 86 suitably mounted, as by brackets 88, to the mounting plate 38 in positions therebetween and adjacent the units 74. The longitudinally forwardly extending pistons of the units 86 are fixed to a horizontally extending tube moving bar 90. The bar 90 includes a forwardly facing arcuate tube engaging surface 92 which has its arcuate axis disposed in a horizontal plane which also passes generally through the axis of the manifold tube 10 when the latter is gripped between the pads 44 and 58.

Referring now more particularly to FIGS. 12 and 13, there is shown therein an extruding device, generally indicated at 100, which is operable to extrude the film or strip of sealing material 32 previously described. To this end, the device 100 is mounted for horizontal rectilinear movement in a position above the space provided between the two bars 48 and 56 and more specifically in vertical alignment with the position of the end surface of the panel 12 when the latter is disposed in fixedly engaged position between the pads 40 and 50.

There is provided a cantilevered frame assembly or structure 102 which includes a pair of horizontally extending parallel guide rails 104 onto which is slidably mounted a carriage 106 on which the extruding device 100 is carried. The cantilevered frame structure 102 is mounted for rectilinear vertical movement as by a pair of vertically extending posts 108, the lower ends of which are fixedly secured on the side of the bench (not shown) on which the mounting plate 38 is mounted. The cantilevered frame structure 102 includes a vertically extending member 110 which is slidably mounted on the posts 108 and has its upper end fixedly connected with the guide rails 104. The frame structure 102 also includes a connecting member 112 which serves to rigidly interconnect the free ends of the guide rails 104, the entire assembly being braced by a pair of diagonally extending brace members 114 extending from the ends of the member 112 to the vertically extending member 110.

Means is provided for raising and lowering the cantilevered frame assembly 102 with respect to the panel structure and manifold tube handling apparatus disposed therebelow which, as shown, includes a pair of piston and cylinder units 116 connected between the vertically extending member 110 and a plate 118 fixed to the upper end of the guide posts 108. In a similar fashion, means is provided for effecting the horizontal movement of the extruding device 10 along the guide rails 104. To this end, there is provided a piston and cylinder unit 120, the piston rod end of the cylinder of which is fixed to the upper surface of the vertically extending frame member 110 and the free end of the piston rod of which is connected to the carriage 106. It will be noted that the outlet of the extruding device 100 is slightly canted so that the strip or film of sealing material 32 which issues therefrom has a slight component of movement in the direction toward the plane of the end of the panel structure. As the extruding device 100 is moved horizontally along the guide rails 104 by the piston and cylinder unit 120, the strip will be progressively formed in such a way that it contacts and adheres to the end of the panel structure.

Referring now more particularly to FIGS. 14-19, the extruding device 100 comprises, in general, a barrel section 122 within which is mounted a rotatable feed screw assembly 124 driven by an output shaft 126 of an electric motor 128 through a torque limiting coupling assembly 130. Leading to the barrel section 122 is a plastic pellet feed tube 132 which communicates with the interior of the barrel section and the feed screw 124 so as to cause a supply of plastic pellets placed in the feed tube 132 to flow outwardly into and through the barrel section into a heated nozzle assembly 134 which is connected with the barrel section 122 by means of a heat dam or shield assembly, generally indicated at 136.

The barrel section 122 is in the form of a unitary tubular member having an enlarged portion 138 at its upper end so as to receive the torque limiting coupling assembly 130. As best shown in FIGS. 14 and 15, the coupling assembly 130 includes a driven annular member 140 fixed to the depending end of the motor shaft 126, as by a key 142. The member 140 is suitably journaled within the enlarged upper end portion 138 of the barrel section 122 by a thrust bearing assembly 144, which bearing assembly is also engaged by the flange of an apertured mounting plate 146 connected with the carriage 106. Formed in the annular member 140 is a series of annularly spaced radially extending openings 148, each having a ball 150 mounted in the inner end thereof which is resiliently biased to move in a radially inward direction by a coil spring 152 mounted within the associated opening and held therein by a plug 154. As best shown in FIG. 15, there are six equally spaced balls 150, each of which is resiliently biased to move out of the associated opening 148 and into a recess 156 formed in the adjacent periphery of an upper shaft portion 158 of the feed screw assembly 124.

The shaft portion 158 is suitably journaled in a central reduced diameter portion 160 of the barrel section 122, as by bearings 162. The feed screw assembly 124 includes a short central shaft portion 164 of reduced diameter extending downwardly from the shaft portion 158 and formed integrally with the lower end of the reduced shaft portion 164 is a double helix tapered screw 166.

The plastic pellet feed tube 132 is secured to one side of the central portion 160 of the barrel section 122 and the latter is formed with a downwardly and inwardly sloping opening 168 which opens at its outer upper periphery with the lower portion of the feed tube 132 and at its lower inner periphery with the interior of the central portion 160 of the barrel section 122 at a vertical level coextensive with the lower section of the reduced shaft portion 150 and the upper section of the double helix tapered screw 166.

Figure 16:
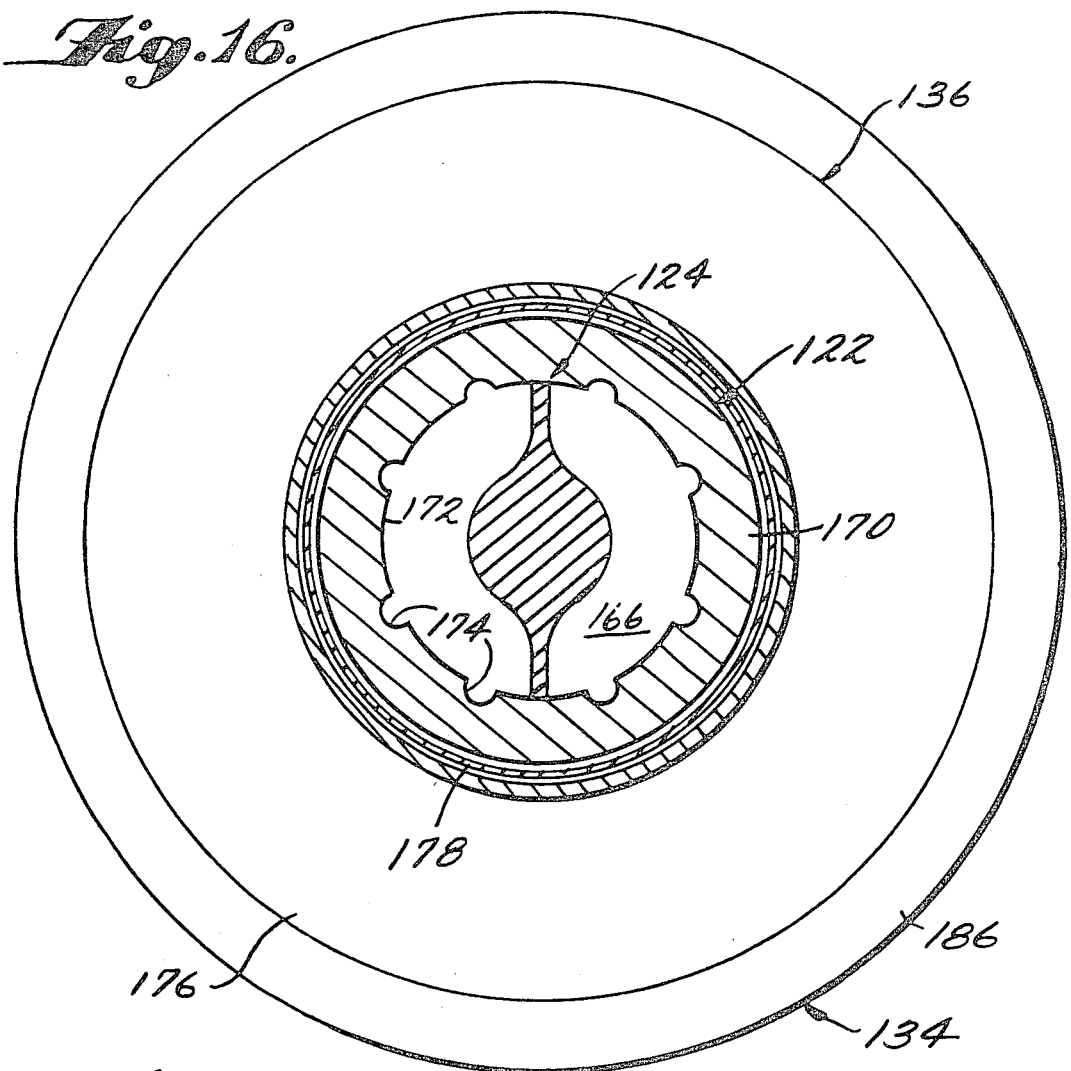
FIG. 16 is an enlarged fragmentary sectional view taken along the line 16—16 of FIG. 14.

As shown, the barrel section 122 includes a lower portion 170 which has a frustoconical interior peripheral surface 172 which closely approximates the exterior periphery of the tapered screw section 166. Formed in the wall of the lower portion 170 of the barrel section 122 is a series of elongated longitudinally extending slots 174 which are equally annularly spaced about the frustoconical interior peripheral surface 172. As shown, the slots extend upwardly into the central portion 130 and terminate adjacent bearings 162. As best shown in FIG. 16, there are eight slots 174 formed in the interior peripheral surface 172, which slots serve to prevent plastic pellets engaged by the screw 166 from turning with the screw. In this way, it is insured that the pellets will be continuously compressively engaged and moved longitudinally downwardly as the screw rotates.

In conjunction with the downward movement of the solid plastic pellets insured by virtue of the provision of the slots 174 it is a further feature of the present invention that the temperature of the plastic pellets is prevented from reaching a melting or fusion temperature until the pellets have been moved downwardly an appropriate distance into the heated nozzle assembly 134. To insure that the heat applied in the nozzle assembly does not rise through the barrel section and cause fusion of the solid plastic pellets therein, heat dam 136 is provided. As shown, the heat dam assembly 136 consists essentially of two components: one, an outer finned sleeve member 176 and, the other, an inner thin walled flanged sleeve 178. The thin walled sleeve 178 is preferably made of shiny metal, as for example, titanium, and has an interior periphery which is spaced slightly from the exterior periphery of the lower portion 170 of the barrel section 122. As shown, sleeve 178 surrounds the lower barrel portion 170 and has its flanged upper end engaged with a peripheral flange 180 formed on the exterior of the barrel section 122 between the lower portion 170 and central portion 160 thereof. The lower end of the thin walled sleeve 178 extends slightly below the lower end of the barrel section 122. The finned sleeve member 176 has an interior periphery which is spaced slightly from the exterior periphery of the thin walled sleeve 178. In this regard, it will be noted that the upper end of the finned member 176 is fixedly attached to the flange 180, as by a series of bolts 182, the fins thereof consisting essentially of a washer-like element having opposed flat surfaces disposed in horizontal planes. The lower end of the finned outer sleeve member 176 terminates above the lower end of the barrel section 122 and is fixedly connected, as by a series of bolts 184, to an annular flange 186 formed on the upper end of a nozzle body section 188 of the nozzle assembly 134.

It will be noted that the upper end of the nozzle section 134 has a central bore 190 extending downwardly therein which is of a diameter size considerably greater than the diameter size of the thin walled sleeve 178. The bore 190 terminates just below the lower end of the sleeve 178 in an upwardly facing horizontal surface 192 having an upstanding conical guide section 194 in the central portion thereof. Extending from the upper surface 192 through the nozzle body section 188 to the lower end thereof is a plurality of annularly spaced passages 196 which are preferably of sector or pie-shaped cross-sectional configuration, there being eight such passages spaced apart by radially extending thin wall sections. The outer peripheries of the passages 196 are generally disposed within a cylindrical plane aligned with the surface of the interior peripheral surface of the cylindrical bore 190.

Figure 17:
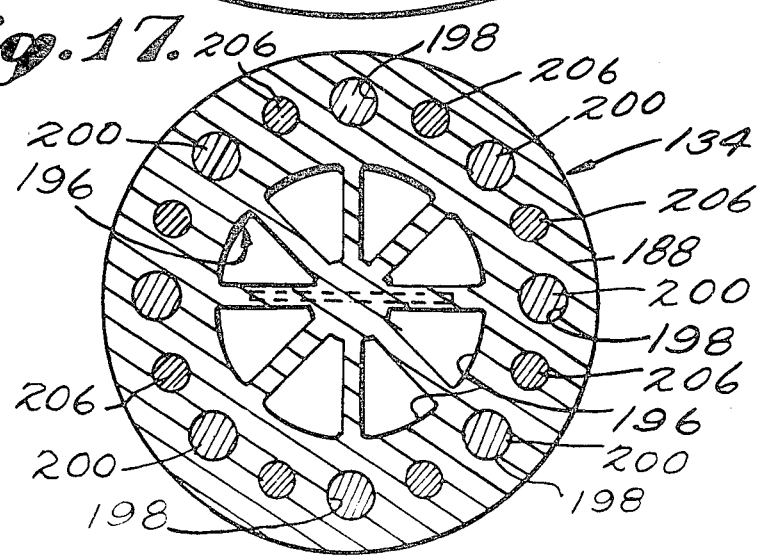
FIG. 17 is an enlarged fragmentary sectional view taken along the line 17—17 of FIG. 14.

Extending through the outer annular portion of the nozzle body section 188 is a series of heater receiving bores 198 of a number corresponding to the number of passages 196. As best shown in FIG. 17, the axis of each of the bores 198 is disposed within a radial plane passing through the axis of the central bore 190 of the body section 188 and through an associated one of the thin wall sections between a pair of adjacent passages 196. In this way, when suitable electrical heaters 200 are mounted within each of the bores 198, heat from the same will be distributed to the radially extending thin wall section as well as the peripheral wall sections defining the passages 196, thus insuring that a relatively uniform heat will be applied. An example of a heater 200 which may be utilized is a 400 watt, $\frac{1}{2}''$ diameter Watlow ® heater. The upper ends of the bores 198 are maintained in open relationship by providing an annular groove 202 in the exterior periphery of the nozzle body section 188 at a position below the annular flange 186 thereof and extending to a level just below the lower end of the barrel section 202.

The nozzle assembly 134 includes a nozzle tip section 204 which is fixedly mounted on the lower end of the nozzle body section 188, as by a series of annularly spaced longitudinally extending bolts 206. As best shown in FIG. 18, the bolts 206 are spaced between downwardly and inwardly tapering heater bores 208 which are disposed in alignment with the heater bores 198 of the nozzle body section 188. The nozzle tip section 204 includes an outlet slot 210 of a cross-sectional configuration conforming generally with the desired cross-sectional configuration of the film or strip 32 of sealing material utilized in practicing the method. The nozzle tip section 204 also includes geometrically symmetrical transitional passages for directing the hot molten sealing material passing from the lower ends of the eight segmental passages 196 to the outlet 210 which is of thin elongated cross-sectional configuration. As best shown in FIG. 18, such transition passages include four frustoconical bores 212 each of which has its axis disposed within a radial plane passing through the axis of the bore 190 which bisects a radially extending thin wall section between two adjacent passages 196 at each side and at each end of the slot 210. Extending from the central lower portion of each bore 212 is an inclined passage 214 communicating with the upper end of the outlet slot 212. It will be noted that the lower surface of the nozzle tip section 204 is cut off at an angle as indicated at 216, so that the surface will be disposed generally vertically when the device 100 is mounted in the position shown.

The nozzle assembly 134, heat dam assembly 136, barrel section 122, screw 124 and adapter flange 108, constitute a high volume low length to diameter (L/D) ratio extruder. As illustrated, a screw having a L/D ratio of approximately 3.3:1 achieves through puts only available in conventional extruders having L/D ratios ranging between 24:1 to 30:1. High output from low L/D ratio in the extruder device invention is possible because the extrusion operation is separated into two distinct functional events.

Screw 124 and barrel 122 cooperatively serve as a pump developing cold hydrostatic pressure in thermoplastic pellets or particulate matter entered through feed tube 132. Screw 124 is designed to have a minimum of two particle diameters internal clearance between successive thread leads, and accordingly, does not clog due to interference of compressed particles. Further, the start of the threaded portion of the screw is below the feed plane. Heat of compression (work done by changing the volume as pressure develops in a particulate matter passing through the clearance volume between screw 124 and barrel 122) is removed on finned cooling member 176, and prevents agglomeration of particulate matter passing through the clearance volume established by screw 124 and barrel 122. Particulate matter is directed axially, preferably by slots 174 in barrel 122. Slots 174 are arranged on the elements of a truncated cone and extend from a larger diameter at the outlet side of barrel 122.

Particulate matter pressured by the action of rotating screw 124 within barrel 122 is delivered to within about five particulate matter diameters into the nozzle body section 188. Particulate matter under pressurization from the action of screw 124 and barrel 122 melts on the internal passage surfaces of the nozzle body section 188 which is maintained at temperatures up to 300° F. over the fusion temperature of resin charged as pellets through feed tube 132. The desired temperature within the nozzle body section 188 is achieved and maintained by heater cartridges 200 arranged as shown. Modern Engineering Plastics require relatively high nozzle temperatures ranging to 1000° F. and thus, require a large temperature difference between nozzle assembly 134 and barrel 122 which is maintained within 250° F. of room temperature. In the preferred embodiment, it has been found advantageous to employ heat dam assembly 136 to reduce the amount of heat lost from nozzle assembly 134 to barrel 122 by thermal conduction. It has also been found advantageous to abruptly change the temperature between the compact particulate mass in barrel 122 and nozzle assembly 134 to prevent barrel zone fusion and resulting feed difficulties in the extruder's low L/D ratio operation.

The low L/D ratio of the extruder device coupled with the high rigidity available from support bearings 162 enable high melt function pressure development while achieving high mechanical efficiencies. Mechanical efficiencies are characterized by the losses in radial bearings 144 and amount to less than 2% loss of the available torque. Conventional extruders may be expected to lose up to $\frac{1}{3}$ of the drive motor torque in barrel screw friction, because there is no opportunity for frictionless bearings in high L/D barrel and screw combinations.

Arrestment of thrust force (pressure development $\times$ the screw cross-sectional area, plus reactionary force between helical sides of the screw, particulate matter, and the barrel) are arrested by the bearing assembly 162 and adapter collar 130. Mechanical efficiency in antifriction bearings available to arrest thrust present only 2 to 3% loss. Thus, an overall mechanical efficiency in excess of 90% is available and illustrates a distinct advantage of the invention over conventional extruders.

Its weight-saving advantages are important to applications, such as the present, requiring a portable supply of fused thermoplastic. Moreover, this characteristic renders the device suitable for manual portable service in the actual installations of panels in the field. Such a manually portable device may embody an extrusion outlet of orifice-like configuration in which case passages 196 may simply taper down and merge into such orifice with the heaters being likewise converging. Alternatively, the nozzle body may include a large cavity transversely spirally divided by heaters.

When driven by a $\frac{1}{2}$ hp. series wound motor, reduced to screw driving speeds by conventional gear reducers, the extruder has been packaged to provide 30 pounds of thermoplastic extrudate per hour in a total package weight of less than 30 pounds. This compares with conventional high L/D ratio extruder packages which would characteristically weigh more than 1,000 pounds to achieve the same results, and require several stages of temperature control and variable speed drive motor control.

Another distinctive advantage of the extruder device of the invention, is the relatively low internal clearance volume compared to conventional extrusion apparatus. This design feature enables start and stop operation, including repeated shutdown to room temperature with polycarbonate resins in place without freeze-up damage usually expected in conventional equipment. This is basically because operation of the pumping and melting functions enable high ductility material selections for nozzle assembly 134 compared to fully hardened brittle material selections for surfaces which must serve as a bearing for the rotating screw in hot plastic weld zones of conventional high L/D extruders. On freeze-up, the hard, non-ductile material selections used in conventional extruders is often damaged by the large stresses developed due to the differences in thermal expansion or stresses developed on start-up due to the long lag time between indicated running temperature achievement and actual melt-in of large masses of plastic in the clearance volume between the screw and the barrel.

In the preferred mode of operation for applications not requiring a continuous output, a predetermined amount (volume or weight) is poured into the hopper and subsequently enters and begins pressurization operation under the influence of the screw. The screw is run continuously, and high intertia startups are avoided. Following the extrusion of the predetermined amount, the heaters in nozzle assembly 134 are turned off and the temperature drops from the controller regulated setting to ambient temperature. Drive motor 128 and screw 126 are then automatically turned off by a sub routine of the temperature controller. This assures a free rotational envelope for the action of screw 126 and enables re-start without developing high motor loads.

It will be understood that the apparatus thusfar described is utilized to perform the method as previously described in relation to FIGS. 1–3. Therefore, the operation of the apparatus is believed to be self-evident from the description which has already been made. As best shown in FIG. 9, the apparatus includes an electrically energized vibrator 218 suitably mounted on each of the piston rods of the piston and cylinder units 74 to which the mandrel 28 is connected. These vibrators are of conventional design and construction and preferably are set to impart a vibration to the associated mandrel at an exemplary frequency of 40,000 cycles per second.

The means for passing the treating fluid and the cooling fluid into the main passage 33 of the mandrel 28 is not shown in the drawings. However, it will be understood that treating fluid lines and an air hose or the line communicating with an appropriate source of treating fluid and air under pressure respectively are connected with one or both ends of the mandrel in comminication with the interior passage therein to effect by suitable valving the aforesaid fluid treating and cooling steps in conjunction with the method of the present invention. It will also be understood that suitable automatic controls may be provided for effecting operation of the various components of the apparatus at the appropriate times indicated.

It will also be understood that when the apparatus is used in securing a manifold tube to a panel structure to form a panel assembly such as described in my co-pending application Ser. No. 32,634 filed Apr. 23, 1979, entitled LAPPED SOLAR PANEL ROOF INSTALLATION, U.S. Pat. No. 4,261,338, the manifold tube engaging surfaces 46 and 60 are both disposed at the prerequisite angular inclination as, for example, 3° 10'. In addition, the manifold tube moving member 90 is similarly inclined.

It will also be understood that the method is applicable in effecting the connection of a pair of manifold tubes to each end of a panel assembly so as to communicate the openings therein with the upper passages and lower passages respectively, or a similar connection in which the two manifold tubes are formed integrally as with a dividing diametrically extending wall within a single cylindrical manifold tube, as suggested in my co-pending application Ser. No. 6,240 filed Jan. 24, 1979, entitled IMPROVED HEAT EXCHANGER, which issued Feb. 23, 1982 now U.S. Pat. No. 4,316,436 my co-pending application Serial No. 32,636 filed Apr. 23, 1979, entitled MULTIPLE FLUID MEDIUM SYSTEM AND IMPROVED HOT WATER STORAGE TANK ASSEMBLY UTILIZED THEREIN, which issued on May 5, 1981 as U.S. Pat. No. 4,265,220. In order to supplement the present disclosure in this regard, the above two identified co-pending applications, as well as all of my other co-pending applications herein identified, are incorporated by reference into the present specification. Where multiple manifold tubes are to be connected to each end of the panel structure there would be utilized a pair of mandrels 28 suitably mounted within the two manifold chambers provided to be moved therein simultaneously so that the projecting elements enter the appropriate passages. Also it will be understood that the cross-sectional configuration of the mandrel tubes may be varied to accommodate the different shapes presented.

Finally, where the alternative method procedure described above in connection with FIGS. 1, 4 and 5 is to be performed, the extruding device 10 is replaced by the resistance wire screen 35 as shown in FIG. 20. The resistance wire screen 35 is mounted on the frame assembly 102 by a pair of mounting arms 220, each of which is suitably clamped to the guide tracks 104 at its upper end and to the wire screen 35 at its lower end. It will be understood that the piston and cylinder unit 116 previously described may be used to lower the wire screen 35 from a raised inoperative position into an operative position between the end of the panel structure and the apertured side wall of the manifold tube as previously indicated.

It will also be understood that the present application contemplates other arrangements for applying heat as, for example, friction heating, induction heating, etc.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:
1. Apparatus for sealingly connecting a thermoplastic solar panel structure having a multiplicity of elongated thin wall sections defining a multiplicity of parallel passages extending longitudinally between the ends of said panel structure to a thermoplastic manifold tube, said apparatus comprising
panel structure engaging means for fixedly positioning an end of a panel structure to which a manifold tube is to be connected,
means for mounting a manifold tube for movement from a position in which a side wall portion thereof is spaced a predetermined distance from a panel structure end fixedly positioned by said panel structure engaging means into a position of pressure engagement therewith,
an elongated mandrel having a multiplicity of transversely projecting elements corresponding in number and spacing to the panel passages to be communicated with the interior of the manifold tube of a size to engage longitudinally within the interior periphery of said manifold tube,
means mounting said mandrel for transverse movement within said manifold tube,
means for heating the panel structure end and said manifold tube side wall portion when the latter are disposed in said predetermined spaced relation to soften the thermoplastic material thereof, means for moving said mandrel within said manifold tube so as to position the projecting elements thereof through the side wall portion thereof and into the open ends of corresponding panel structure passages and for withdrawing said mandrel in the direction of extent of said elements to a position within the interior of said manifold tube following the connection of the latter to the panel structure end, and means for moving said manifold tube toward said panel structure end so as to cause said manifold tube side wall portion to apply a pressure to said panel structure end sufficient to deform the softened thermoplastic material thereof and effect a fusing of the same into a unitary mass.

2. Apparatus as defined in claim 1 wherein said manifold tube is a tube assembly comprising an exterior tube of a material different from the material of said panel structure and an interior tube liner of a material which is the same as the material of the panel structure, said exterior tube having a series of preformed openings therein corresponding in number and spacing to the panel passages which are to be communicated with the interior of the manifold tube.

3. Apparatus as defined in claim 1 wherein said mandrel includes a central longitudinal passage and each of said projecting elements has a hole extending therethrough from the projecting free end thereof into communication with said central passage whereby a fluid can be passed from said central passage through each of said holes into an associated panel structure passage.

4. Apparatus as defined in claim 1 or 3 wherein said heating means comprises an electrical heating element mounted for movement into a position between said panel structure end and said manifold tube side wall portion.

5. Apparatus as defined in claim 1 wherein said mandrel mounting means comprises a pair of parallel elongated members detachably connected to opposite end portions of said mandrel when said mandrel extends within said manifold tube.

6. Apparatus as defined in claim 5 wherein said mandrel moving means includes a pair of piston and cylinder units connected to move said parallel elongated members longitudinally.

7. Apparatus as defined in claim 1 wherein said panel structure engaging means includes a pair of upper and lower pads of foamed material having lower and upper surfaces respectively conforming in shape with the upper and lower surfaces respectively of said panel structure.

8. Apparatus as defined in claim 1 wherein said manifold tube mounting means comprises upper and lower pads of foamed material having lower and upper planar surfaces respectively for frictionally contacting upper and lower exterior portions of the manifold tube.

9. Apparatus as defined in claim 8 wherein said manifold tube moving means comprises an elongated member having an arcuate surface for engaging a side wall portion of the manifold tube diametrically opposed to the side wall portion thereof within which said openings are formed and piston and cylinder means for effecting horizontal reciprocating movement of said elongated member.

10. Apparatus as defined in claim 1 or 3 wherein said heating means comprises means for extruding a strip of hot thermoplastic material between the spaced panel structure end and the manifold side wall portion, said projecting elements extending through said strip during the movement therein into said corresponding passages, the thermoplastic material of said strip forming a part of the aforesaid unitary mass.

11. Apparatus as defined in claim 10 wherein said extruding means comprises an extruding device and means for mounting said extruding device for movement in a direction parallel with said panel structure end and in a direction transversely thereto toward and away from said panel structure end.

12. Apparatus as defined in claim 11 wherein said extruding device comprises a barrel section, a relatively short longitudinally extending screw section rotatably mounted in said barrel section, means for rotating said screw section within said barrel section about a longitudinally extending axis, means for feeding a supply of solid particles of thermoplastic material into said barrel section to be compressively engaged and moved longitudinally from said barrel section by the rotation of said screw section, a nozzle assembly having passage means for receiving the compressed solid thermoplastic particles moving from said barrel section and directing the same to move out of a spaced extrusion outlet therein, means for heating the solid plastic particles during the movement thereof through said passage means, and means for preventing the heat added by said heating means from being transmitted to the solid particles in said barrel section to a degree sufficient to cause the same to melt so that said screw section compressively engages and moves the plastic material in solid particle form only and is free from contact with molten plastic material.

13. Apparatus as defined in claim 12 wherein said screw section constitutes a double helix tapered screw.

14. Apparatus as defined in claim 13 wherein said screw has a length to diameter ratio of approximately 3.3 to 1.

15. Apparatus as defined in claim 14 wherein said barrel section includes an interior peripheral surface disposed in closely spaced relation to the exterior periphery of said screw, said peripheral surface having a plurality of annularly spaced longitudinally extending slots formed therein.

16. Apparatus as defined in claim 12 wherein said heat transmitting preventing means comprises a heat dam assembly connecting said barrel section with said nozzle assembly.

17. Apparatus as defined in claim 16 wherein said heat dam assembly includes an inner thin walled sleeve fixed at one end to the exterior periphery of said barrel section and extending therefrom in closely spaced surrounding relation to a portion adjacent the discharge end of said screw and an annularly finned member disposed in closely spaced surrounding relation to such thin walled sleeve fixedly connected between the exterior periphery of the barrel section and said nozzle assembly.

18. Apparatus as defined in claim 12 wherein said nozzle assembly includes a body section adjacent said barrel section, said body section including a series of annularly spaced passages of sector shaped cross-sectional configuration extending longitudinally therethrough and a corresponding series of longitudinally extending heaters, each being spaced radially outwardly between an adjacent pair of passages.

19. Apparatus as defined in claim 18 wherein said nozzle assembly includes a tip section having an extrusion outlet of slit-like cross-sectional configuration and a series of symmetrical transition passages between the adjacent end of said sector shaped passages and said extrusion outlet.

20. Apparatus as defined in claim 12 wherein said screw section rotating means comprises an electric motor having an output shaft, said screw section including a shaft portion journaled in said barrel section and torque limiting coupling means between said output shaft and said shaft portion.

21. Apparatus as defined in claim 20 wherein said coupling means includes an annular member fixed to said output shaft having a thrust bearing engaged therewith.

22. Apparatus as defined in claim 1, 3, 5, 17, 18, 19 or 20 wherein said mandrel mounting means includes means for vibrating said mandrel during the fusing of the thermoplastic material so as to stress relieve the same.

* * * * *